March 10, 1925.                                   1,529,549
R. B. OWEN
SECONDARY OR STORAGE BATTERY
Filed March 29, 1922
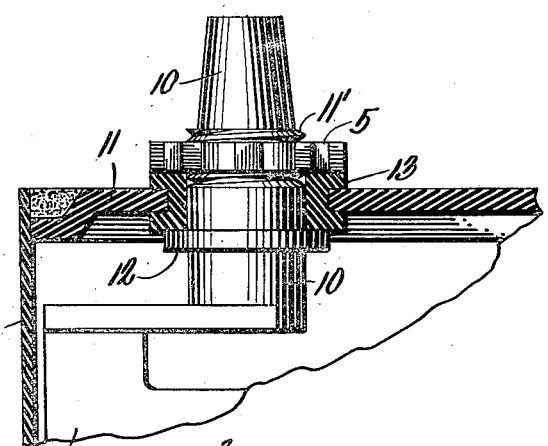
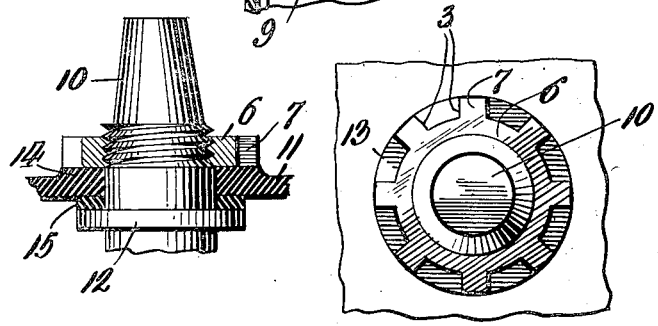
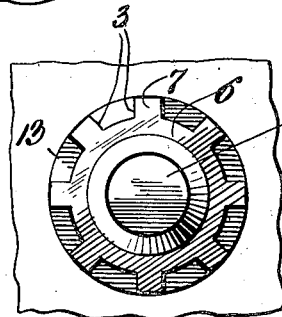
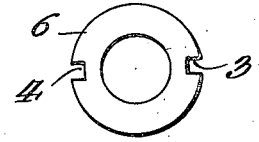
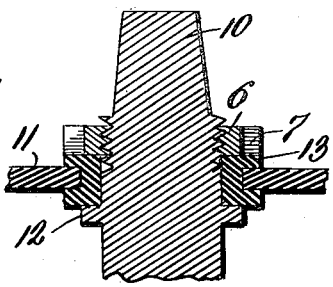
Inventor
Richard B. Owen.

Patented Mar. 10, 1925.

1,529,549

UNITED STATES PATENT OFFICE.

RICHARD B. OWEN, OF WASHINGTON, DISTRICT OF COLUMBIA.

SECONDARY OR STORAGE BATTERY.

Application filed March 29, 1922. Serial No. 547,824.

*To all whom it may concern:*

Be it known that I, RICHARD B. OWEN, a citizen of the United States, residing at Washington, in the District of Columbia, have invented certain new and useful Improvements in Secondary or Storage Batteries, of which the following is a specification.

This invention relates to new and useful improvements in secondary or storage batteries in general, and more specifically to means for providing a strong and inexpensive detachable connection between a terminal post of a battery cell and the cover thereof.

An important object of the invention resides in the provision of a nut of particular formation, which although being less expensive to manufacture, will perform the required functions in a more advantageous manner than has heretofore been experienced. More specifically, the invention resides in the provision of a nut provided with peripheral shoulders which are spaced sufficient distances apart so as to provide for an effective grip being obtained upon the nut in placing the same upon its work or removing it therefrom.

Other objects and advantages of the invention will become apparent during the course of the following description.

In the accompanying drawing forming a part of the description and wherein like numerals are employed to designate like parts throughout the several views:

Figure 1 is an elevational view, principally in section of a connection embodying features of the invention.

Figure 2 is a top plan of the same.

Figure 3 is a sectional view through the connection.

Figure 4 is an elevational view, principally in section illustrating the invention applied to conventional parts of a battery; and Figure 5 is an elevation of a modification of the nut.

In the drawing wherein I have shown the embodiments of the invention which are at present preferred, the numeral 5 designates my improved nut which is preferably, but not necessarily, cast from lead or a lead alloy. The nut consists of a disk of suitable thickness provided with a relatively large central threaded opening, the threads of which are of a pitch to facilitate easy placement and removal of the nut to and from its work. The threaded opening has a diameter slightly less than that of the disk so that after the threaded opening is provided in the disk, it assumes the form of a ring-like body 6, as shown, which requires only the minimum amount of material for its formation.

The periphery of the body 6 is equipped with a plurality of spaced recesses which provide the periphery of the disk with outwardly extending lugs 7, these lugs being adapted to extend a substantial distance outwardly from the periphery and are spaced substantial distances apart as shown. Obviously, the disk can be provided with any number of recesses found desirable, and in fact only two oppositely arranged ones can be employed as shown by the numeral 4 in Figure 5, in cases where a saving of material in the formation of the nut is not essential. The recesses in the periphery of the nut provide the same with a plurality of spaced shoulders 3 as is obvious and the material removed from the recesses represents the saving of material effected in the formation of the nut.

It will be noted that in all forms of the nut, the lugs are relatively wide and are preferably of the same thickness as the disk itself. In other words, the recesses extend entirely through the thickness of the disk or body portion 6 so that the tops of the lugs are arranged in the same plane with the top surface of the nut, while the bottoms of the lugs are arranged in the same plane with the bottom surface of the disk. It will also be noted that the lugs 7, due to the width of the recesses, are spaced substantial distances apart and as shown in Figure 2, wherein the preferred embodiment of the invention is illustrated, the lugs are spaced apart distances equal, or substantially so, to the width of one of the lugs. It is to be particularly noted that by constructing the nut in accordance with this invention, that a relatively wide nut having substantially wide bearing surfaces can be provided with a great deal less material than has been possible in the past, so that a nut is provided, which through the instrumentality of the lugs, their length, or the distance to which they extend beyond the outer periphery of the disk proper, has greater or wider bearing surfaces and at the same time, the nut is equipped with means whereby an effective grip can be obtained thereon.

To demonstrate the superior qualities of the nut, I have shown the same used in conjunction with a connection between a terminal post and a cover of an ordinary electric storage or secondary battery cell. A portion of a battery jar is designated by the numeral 8 and as is well understood, is adapted to contain assemblies of electrodes 9, one of which includes an upstanding post 10 having a threaded portion. A cover 11 is provided for the jar and is equipped with an opening through which the post above its shoulder 12 passes. In Figures 1, 2 and 3 I have illustrated a gasket 13 positioned upon the terminal post 10 between the threaded portion thereof and the shoulder 12 which gasket is provided with a pair of peripheral spaced annular flanges. These flanges are adapted to embrace the edge of the opening in the cover so that the lower flange engages the under side of the cover and the upper flange engages the top thereof. In Figure 4 the top of the cover 11 is shown provided with the usual upstanding boss 14 surrounding the opening in the cover.

After the cover has been positioned on the battery cell with the post extending through the gasket 13 and opening in the cover, the nut 5 is screwed upon the post, it being appreciated that the shoulders facilitate a gripping action upon the nut to drive it home tightly against either the gasket 13 or the boss 14 of the cover whichever construction is employed. When the nut is screwed down tightly to make its abutment, it will be seen that the lower faces of the lugs 7 bear firmly against the gasket 13 or the boss 14 to provide an additional bearing surface for the nut. In this manner, it will be seen that the top flange of the gasket 13 will be held down at all points firmly against the cover to establish a secure connection between the terminal post and cover, while the nut when employed in a construction as shown in Figure 4, will cause the shoulder 12 of the terminal post to compress the gasket 15 arranged thereon against the cover to effect the desired seal.

Were it not for the fact that the bottoms of the lugs 7 are arranged in the same plane with the bottom of the nut, it will be obvious that in order to provide a nut having an equal amount of bearing surface, more material would have to be used in forming the nut. In other words, to provide a nut containing all of the advantages of applicant's, the diameter thereof would have to be increased so that the nut would entirely cover the gasket or the boss 14. The amount of material which is saved is that represented by the recesses between the lugs 7.

The foregoing description and the accompanying drawings have reference to the preferred or improved embodiments of my invention. It is to be understood however, that such changes may be made in construction and arrangement of parts, materials, dimensions, etc., as may prove expedient and fall within the scope of the appended claims.

Having thus described and illustrated my invention, what I now desire to claim as new and secure by Letters Patent is:

1. A nut for a terminal post of a storage battery comprising a body portion equipped with a central threaded opening, radial lugs on the periphery of the body portion, and the radial lengths of said lugs being approximately the same as the distance from the base of one lug to the edge of the threaded opening.

2. A nut for a terminal post of a storage battery comprising a body portion equipped with a threaded opening, substantially rectangular radial lugs on the periphery of the body portion, the tops and bottoms of said lugs being arranged in the same plane with the top and bottom of said nut, and the radial lengths of said lugs being approximately the same as the distance from the base of one lug to the adjacent edge of the threaded opening.

In testimony whereof, I affix my signature in presence of two witnesses.

RICHARD B. OWEN.

Witnesses:
E. E. OWEN,
R. A. McLEOD.